Jan. 8, 1929.
G. W. JOHNSON
1,698,405
COLLAR CONDITIONING APPARATUS
Filed July 31, 1922
5 Sheets-Sheet 3
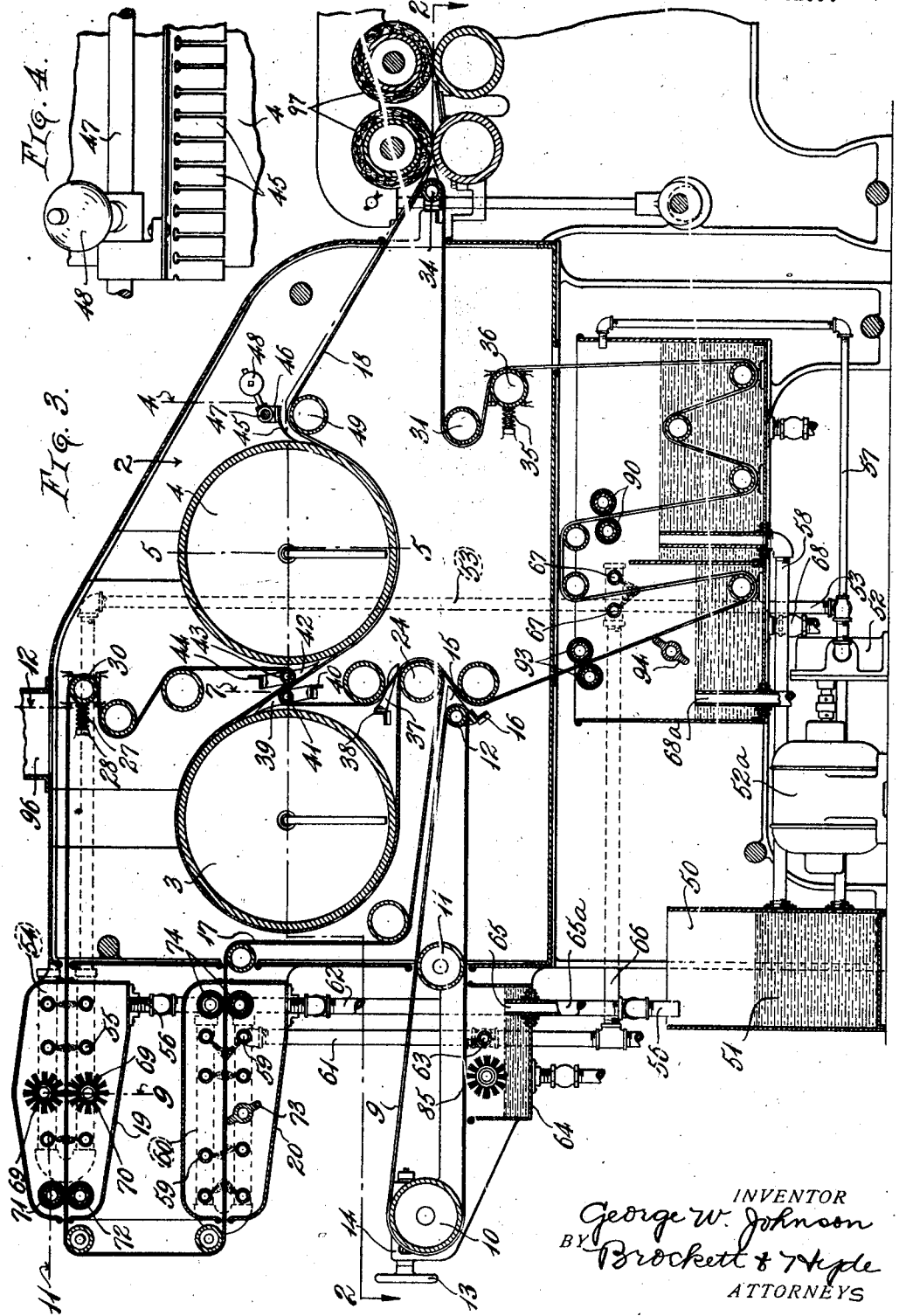
INVENTOR
George W. Johnson
BY Brockett & Hyde
ATTORNEYS

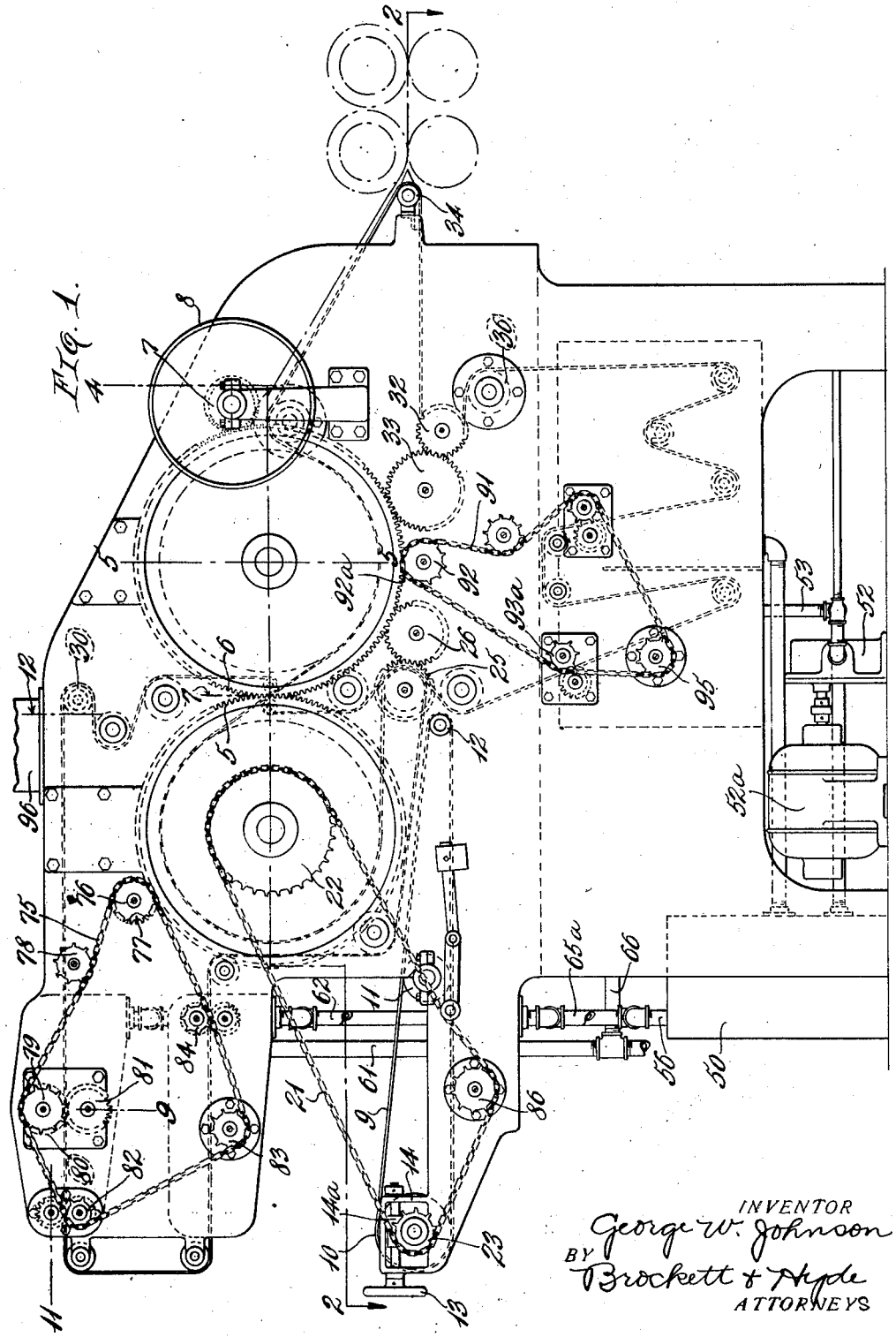

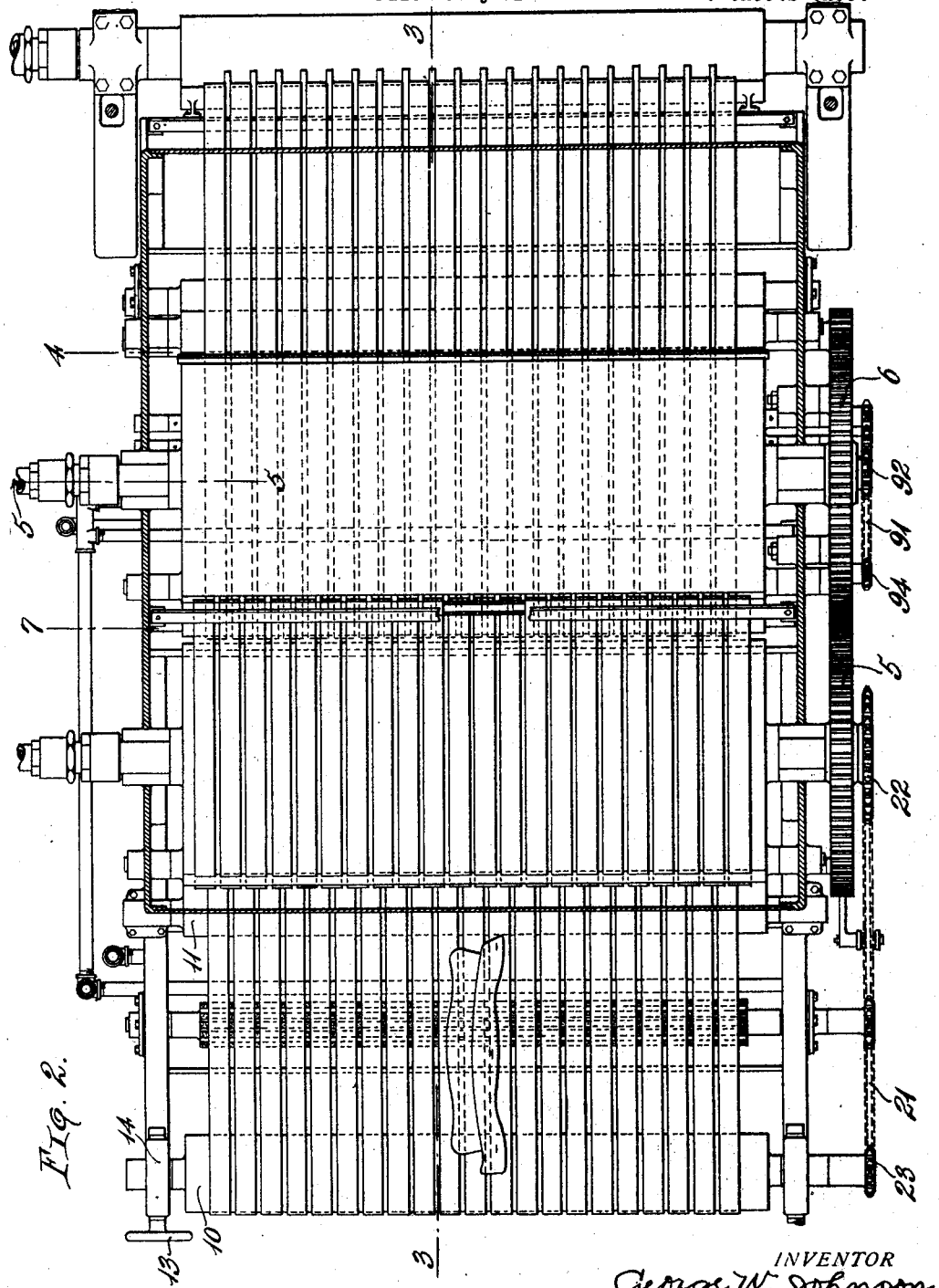

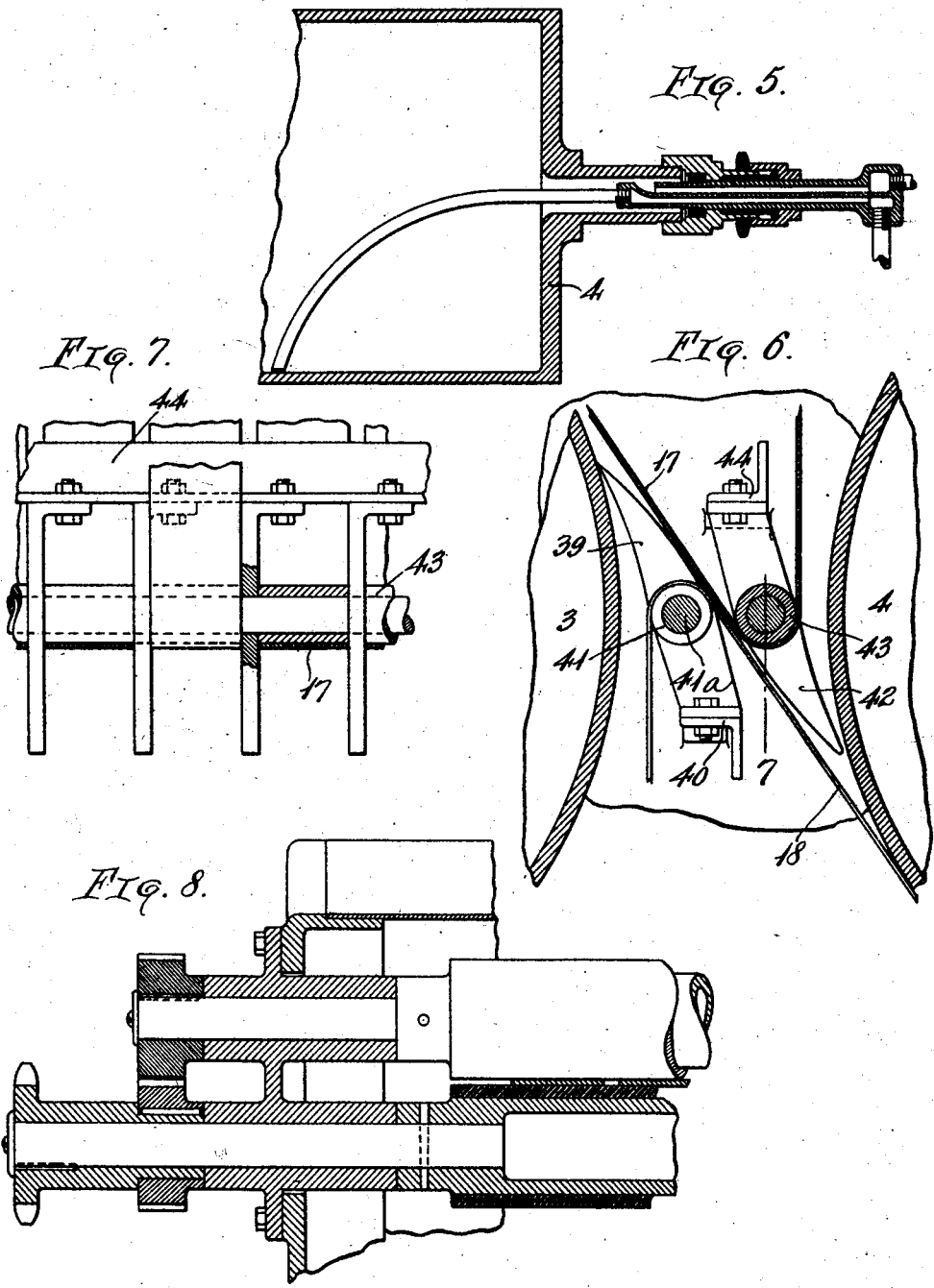

Jan. 8, 1929.  G. W. JOHNSON  1,698,405
COLLAR CONDITIONING APPARATUS
Filed July 31, 1922   5 Sheets-Sheet 5
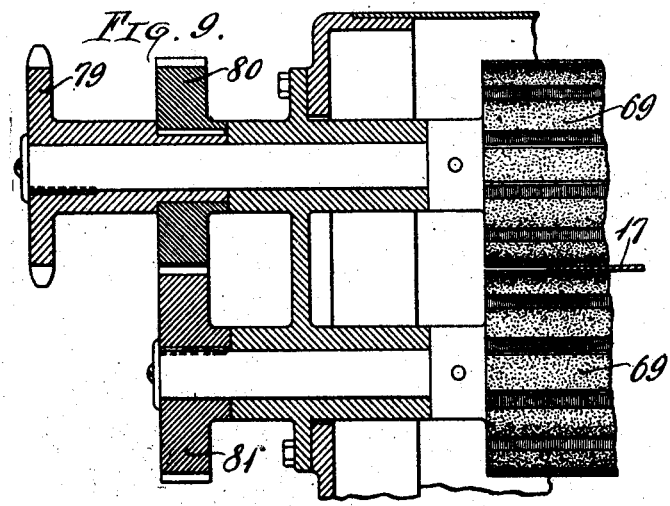
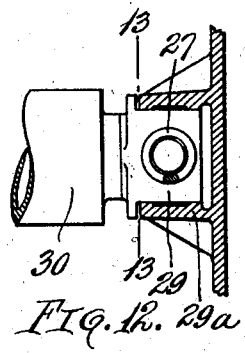
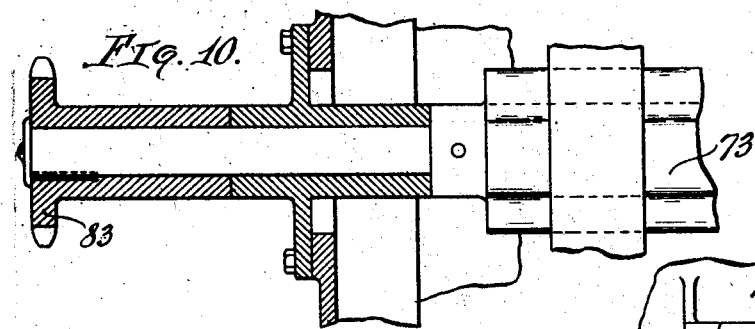
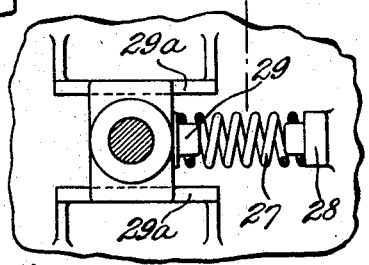
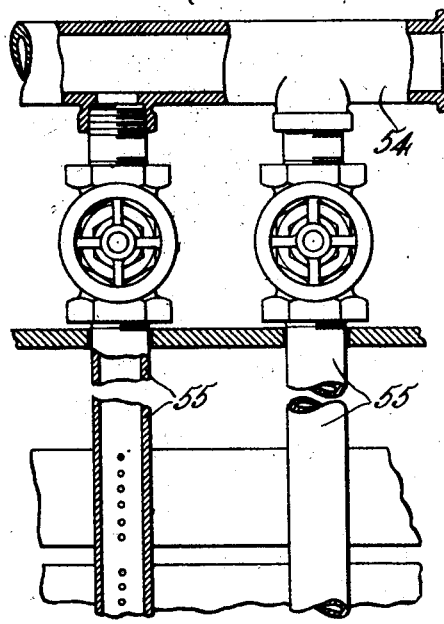
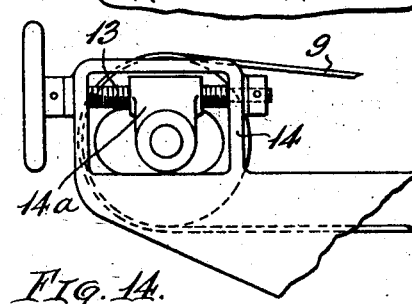
INVENTOR
George W. Johnson
BY Brockett + Hyde
ATTORNEYS Patented Jan. 8, 1929.

1,698,405

UNITED STATES PATENT OFFICE.

GEORGE W. JOHNSON, OF CINCINNATI, OHIO, ASSIGNOR TO THE AMERICAN LAUNDRY MACHINERY COMPANY, OF CINCINNATI, OHIO, A CORPORATION OF OHIO.

COLLAR-CONDITIONING APPARATUS.

Application filed July 31, 1922. Serial No. 578,653.

This invention relates to improvements in laundry apparatus for conditioning collars and the like preparatory to their introduction to an ironing machine.

The object of this invention is to provide an improved structure for setting the starch of starched work preparatory to its introduction into an ironing machine; furthermore, to provide means for automatically removing the starch deposits from the work conveyors so as to maintain them in clean condition for the transmission of the work through the conditioning chamber.

Further objects of this invention are to provide a plurality of heated rolls about which the starched work is passed by means of a series of endless belts, these parts being so arranged that both sides of the work are presented to the surfaces of the heated rolls; furthermore, to provide auxiliary chambers for use in connection with the conditioning chamber and through which the conveyor belts are passed for the purpose of dissolving the starch deposits from the belts and then rinsing the belts; furthermore, to provide a circulatory system for forcing a starch solvent into the auxiliary chambers so as to apply the solvent solution, as for instance a malt solution, to the belts and to return the same to a common supply chamber.

Another object of this invention consists in an improved arrangement of the introductory feeding belt and the endless conveyor belts with respect to the conditioning chamber so as to afford a simple and yet an effective arrangement by which the starched work can be introduced into the chamber at one side and discharged from the other side into the ironing machine.

Other objects of this invention will be apparent from the following description and claims when considered together with the accompanying drawings.

Fig. 1 is a side elevation of my improved apparatus; Fig. 2 is a horizontal section taken on line 2—2 of Figs. 1 and 3; Fig. 3 is a longitudinal section on line 3—3 of Fig. 2; Fig. 4 is a detail section of the doffer knife of the second heated roll, this view being taken on line 4—4 of Figs. 1, 2 and 3; Fig. 5 is a section of one of the heated rolls taken on line 5—5 of Figs. 1, 2 and 3; Fig. 6 is a sectional detail view of the doffer fingers arranged between the first and second conveying belt; Fig. 7 is a sectional view of the doffer fingers on line 7—7 of Figs. 1, 2, 3 and 6; Fig. 8 is a sectional view of one of the pairs of wringer rolls; Fig. 9 is a sectional view of the rotary brushes taken on line 9—9 of Figs. 1 and 3; Fig. 10 is a sectional view of one of the apron vibrators; Fig. 11 is a detail sectional view of one of the ribbon cleaning devices taken on line 11—11 of Figs. 1 and 3; Fig. 12 is a sectional view of the spring take-up for the ribbon conveyor taken on line 12—12 of Figs. 1, 3 and 13; Fig. 13 is a sectional view of the spring take-up on line 13—13 of Fig. 12; and Fig. 14 is a detail of the tightener for the ribbon feed.

My improved apparatus comprises a conditioning chamber 2 in which the work is passed into and out of range of a suitable source of heat for conditioning the work. The heating means for said chamber shown in the drawings comprises heated rolls 3, 4 about which the work is passed and means for supplying fluids for cleaning the endless conveyors which transfer the starched work through the conditioning chamber. The endless conveyors are provided with auxiliary chambers for the purpose of applying a starch solvent and a rinsing fluid thereto, these chambers being arranged below and to one side of the conditioning chamber.

The rolls 3 and 4 which are suitably mounted within the conditioning chamber are provided with gears 5 and 6 respectively upon the outer ends of their shafts, these gears being driven by the pinion 7 operated by the pulley drive 8 which may be driven by any suitable motive power. These rolls are heated by steam through their journalled connections as clearly indicated in Fig. 5 of the drawings. The conveyor 9 which comprises a plurality of endless ribbons, extends about the idle rollers 10, 11 and 12, the roller 11 being located in the opening provided in the wall of the conditioning chamber and constituting a closure therefor. The roller 10 may be adjusted by means of the screw 13 which is mounted in the bracket 14 of the machine frame and extends through the bearing 14ª of the roll. This arrangement is for the purpose of regulating the tautness of the conveyor 9. The work when introduced to the conditioning chamber is placed upon the conveyor 9 which delivers the same to the conveyors 17, 18, each of which comprises a plurality of endless ribbons. Doffer fingers 15 are mounted upon the angle iron 16 for the purpose of properly directing the work so as to find its way between the endless conveyors 17 and 18. The conveyor 17 extends about a series of idle rollers and the heated roll 3, and passes out through the wall of the conditioning chamber and through the auxiliary cleaning chambers 19 and 20. The conveyor 9 is driven by means of the sprocket chain 21 which extends about the sprocket 22 on the shaft of the heated roll 3 and also about the sprocket 23 on the shaft of roll 10. The conveyor 17 is driven by means of the spool 24 upon the shaft of which there is provided the gear 25 meshing with the gear 26 which in turn is driven by the gear of the heated roll 4. The conveyor 17 is maintained in proper taut condition by means of the spring 27 which abuts at one end against the lug 28 while at its other end it abuts against the bearing 29 of the roller 30 about which the conveyor 17 extends. The bearings of this roller are slidably mounted in suitable slideways 29ᵃ in the frame of the machine structure, as clearly shown in the drawings.

The conveyor 18 extends about a series of idlers and is driven by means of the idler 31 upon the shaft of which there is provided the gear 32 meshing with the gear 33 which in turn is driven by the gear of the heated roll 4. The conveyor 18 extends out through an opening in the end wall of the conditioning chamber and about the idler 34 which is located adjacent the rolls of an ironing machine, as clearly indicated in the drawings. The conveyor 18 is also provided with a tensioning device comprising the spring 35 which forces the idler 36 against the conveyor in the same manner as described for the tensioning device of the conveyor 17. The conveyor 18 extends out through openings in the bottom of the conditioning chamber so as to pass through auxiliary chambers which contain a solvent solution for the starch deposits and also a rinsing solution so that the conveyor will be cleaned of any such deposits.

The work upon being fed into the conditioning chamber upon the conveyor 9 is received at the idler 24 between the two conveyors 17 and 18 both of which extend about this idler. The doffer fingers 37, which are suitably mounted upon the angle iron 38 in the machine frame, are provided for the purpose of guiding the work so as to pass along with the conveyor 17 and about the heated roll 3 which rotates in a clockwise direction, Fig. 3. The doffer fingers 39, mounted upon the angle irons 40, are arranged between idlers 41, the shafts 41ᵃ extending through these fingers. Fingers 39 prevent the work from adhering to the roll 3 and guide it so as to pass between the conveyors 17 and 18 which overlap at this point between the two heated rolls. Similar doffer fingers 42, which are mounted upon the shaft of the idlers 43 and also upon the angle irons 44 in the machine frame, insure the work passing with the conveyor 18 about the lower portion of the heated roll 4 which rotates in a counter-clockwise direction, Fig. 3. The flexible stripping fingers 45 are mounted upon the bracket 46 fixed to the rock shaft 47 upon which there is also fixedly mounted the weight 48 for the purpose of normally causing the fingers 45 to bear against the surface of the heated roll 4. In this way, the work is prevented from following around the upper portion of the roll 4 and is guided along the conveyor 18 as it passes about the idler 49. From this point the work is fed out of the conditioning chamber so as to be presented between the heated pressure rolls 97 of the ironing machine.

The means for supplying the solvent solution to the several chambers through which the conveyors are passed, comprises the storage or supply tank 50 containing the starch solvent solution 51, as for instance a malt solution, and having communication with the gear pump 52 which forces this solution through the pipe connection 53 to the manifold 54 located to one side of the chamber 19. The pump is operated by motor 52ᵃ. Perforated spray or ejecting pipes 55 extend from the manifold 54 through the wall of the chamber 19 both above and below the conveyor 17 so as to spray the starch solvent solution upon both sides of the conveyor. Each spray pipe has a valve so as to regulate the pressure in each one. This solution returns through the pipe connection 56 and is discharged into the supply tank 50. The chamber 20, through which extends the conveyor 17 after passing through the chamber 19, is provided with a plurality of spray pipes 59 extending from a manifold 60 through the walls of the chamber 20 both above and below the conveyor 17 so as to spray water upon the same to remove the malt solution therefrom. The manifold 60 is supplied with water through pipe 61 from any suitable source, and the water from the chamber 20 is discharged through the outlet pipe 62. A spray pipe 63 having communication with the water supply pipe 61 extends through the side wall of the container 64 below the conveyor 9 so as to spray water upon the same for the purpose of cleansing the same. An overflow 65 is provided and the water from this container is discharged through the outlet pipe 65ᵃ. The auxiliary chamber located below the conditioning chamber has one portion thereof partitioned off to serve as a water compartment which is supplied from the pipe 66 communicating with the main supply pipe 61. The spray pipes 67 extend from the pipe 66 through the walls of the auxiliary chamber so as to spray water upon the opposite sides of the conveyor 18. Discharge and overflow pipes 68 and 68ª are also provided. It is to be understood that either of the arrangements for cleaning the conveyors 17 and 18 may be adopted for both of them alike instead of having different arrangements.

In addition to the several means for applying starch solvent solution and cleansing fluid to the several conveyors, I have provided also brushes, beaters, and wringer rolls for the purpose of freeing any remaining starch and removing the fluid from the conveyors. In chamber 19, for instance, there are provided brushes 69 and 70 arranged above and below the conveyor 17, and also the wringer rolls 71 and 72 similarly arranged on two sides of the conveyor. The brushes are rotated so as to sweep in a direction opposite to that of the conveyor. In the chamber 20 there is provided the beater or agitator 73, the arms of which are adapted to strike the conveyor for the purpose of removing any particles of starch therefrom, and another set of wringer rolls 74 is provided at the point where the conveyor 17 leaves the chamber 20. These several rotary means for loosening the starch particles and removing the same as well as the fluid from the conveyor 17 are operated by means of a sprocket chain 75 which is driven by means of a sprocket 76 on the shaft of a pinion 77 which meshes with the gear of the heated roll 3. This sprocket chain extends past the idler 78 and drives the sprocket 79 upon the shaft of which there is provided a gear 80 meshing with the gear 81, these last named gears driving the brushes 69 and 70. Upon the shafts of the wringer rolls 71 and 72 there are provided meshing pinions, the lower one of which is driven by means of the sprocket 82 on the shaft thereof, this sprocket being driven by the sprocket chain 75. The beater 73 is driven by means of the sprocket chain which engages sprocket 83 mounted on the shaft of the beater. The wringer rolls 74 are driven by means of meshing pinions on the shafts of the same, one of these shafts being driven by a sprocket 84 which engages with the sprocket chain 75. The brush 85, which dips into the water bath below, engages the lower face of the conveyor 9 and is driven in opposite direction to the conveyor by means of the sprocket 86 about which extends the sprocket chain 21. The wringer rolls 90, which are provided for removing the starch solvent solution from the conveyor 18, are driven by means of the meshing pinions, one of which is driven by a sprocket on the shaft thereof, this sprocket being driven by the sprocket chain 91 extending thereabout. The sprocket chain 91 is driven by means of the sprocket wheel 92 on the shaft of pinion 92ª which in turn is driven by the gear of heated roll 4. The wringer rolls 93, which remove the fluid from the conveyor 18, are driven by means of meshing pinions on the shafts thereof, and on the shaft of one of which there is provided a sprocket 93ª driven by the chain 91. The beater 94, which engages the conveyor 18 at a point just above the water in the auxiliary chamber, is rotated by means of a sprocket 95 mounted on the shaft thereof and engaging the sprocket chain 91. This beater is like the one indicated by reference numeral 73, and is adapted to loosen and remove any particles of starch on the conveyor.

I have also provided an air outlet 96 which may be connected with any suitable exhauster for the purpose of creating an air circulation through the conditioning chamber so as to permit the moisture which is liberated from the starched work to pass off and thus facilitate the setting of the work prior to the ironing operation.

Thus it will be seen that through the operation of the pulley 8 and the several connections between the same and the parts described, the work will be fed from the conveyor and caused to pass about the heated roll 3 by means of the conveyor 17, thence by means of the conveyor 18 about the lower part of the heated roll 4 so as to set the starch on both sides of the work which finally passes out of the conditioning chamber for the ironing operation. The starch, which will adhere more or less to the ribbons of the several conveyors as the starched work is transmitted by them to and through the conditioning chamber, is removed therefrom so as not to interfere with the operation of the device. It is to be understood that the heat of the roller is not great enough to iron the work but is sufficient only for driving off the necessary moisture so as to give to the work the proper degree of stiffness and dampness for the ironing operation. With the motor in operation a continuous circulation is provided for the starch solvent solution through the several chambers described.

Having described my invention, I claim:—

1. Laundry conditioning apparatus, comprising a chamber, heating means within said chamber, conveyor means for moving starched work into and out of heating range of said heating means, and fluid means for automatically removing starch from said conveyor means.

2. Laundry conditioning apparatus, comprising a chamber, heated means in said chamber, conveyor means for passing starched work about said heated means, and means for automatically removing starch from said conveyor means.

3. Laundry conditioning apparatus, comprising a heating chamber, a plurality of endless conveyors for conducting starched work through the chamber, a receptacle associated with each of said conveyors for applying starch solvent thereto, and means for circulating the starch solvent through said several receptacles.

4. Conditioning apparatus for starched laundry, comprising a conditioning chamber, endless belt conveyor means adapted to receive starched work at one point, to convey said work through said chamber, to deliver the work at another point, and to return for receiving additional work, and means for automatically subjecting the returning conveyor means to the action of a starch solvent, whereby any starch is removed from said conveyor means prior to its receipt of fresh work.

5. Apparatus of the kind specified in claim 4, wherein said last named means comprises means located adjacent the path of travel of the returning conveyor means and arranged to discharge the starch solvent against the same.

6. Apparatus of the character described in claim 4 including also means for removing the starch solvent and the starch dissolved thereby from the returning conveyor means.

7. Apparatus of the character specified in claim 4, including means located adjacent to the path of return travel of the conveyor means for applying a rinsing solution thereto to remove the starch solvent.

8. Apparatus of the character described in claim 4, including means located adjacent the return path of travel of the conveyor means for applying a rinsing solution therefrom to remove starch solvent, and additional means for removing excess rinsing solution from the conveyor means.

9. Apparatus for conditioning damp starched collars or the like preparatory to ironing the same, comprising heating means, a conveyor for receiving work after the same has been starched and for conducting said work about the heating means, and starch removing means for said conveyor comprising a reservoir containing a starch solvent through which the conveyor passes.

10. Apparatus for conditioning starched collars or the like preparatory to ironing the same, comprising heating means, a pair of endless conveyors for conducting starched collars or the like about the heating means, starch removing means for each of said conveyors, each means comprising a reservoir containing a starch solvent through which the conveyor passes, and means for washing the solvent from said conveyors.

11. Apparatus for conditioning starched collars or the like preparatory to ironing the same, comprising heating means, conveying means for subjecting the collars or the like to the effect of said heating means, said conveying means having work advancing and idle return movements, and means effective upon said conveying means while idly returning for continuously freeing the same from starch preparatory to its reception of starched collars to be conditioned.

12. Apparatus for conditioning damp starched collars or the like preparatory to ironing the same, comprising heating means, conveying means for subjecting starched collars or the like to the effect of said heating means, means for agitating said conveying means to free the same from starch deposited thereon, and means for subjecting the conveying means to the effect of a solvent for dissolving starch deposited upon said conveying means.

In testimony whereof I hereby affix my signature.

GEORGE W. JOHNSON.